United States Patent [19]
Holmes-Farley et al.

[11] Patent Number: 5,182,143
[45] Date of Patent: Jan. 26, 1993

[54] LAYERED SOL-GEL COATINGS

[75] Inventors: Stephen R. Holmes-Farley, Raleigh; Lynn C. Yanyo, Cary, both of N.C.

[73] Assignee: Lord Corporation, Erie, Pa.

[21] Appl. No.: 486,367

[22] Filed: Feb. 28, 1990

[51] Int. Cl.$^5$ .......................... B05D 1/36; B05D 7/00
[52] U.S. Cl. ....................................... 427/409; 427/410; 427/412.1; 427/430.1; 427/435; 428/412; 428/447; 428/450
[58] Field of Search ................ 427/387, 402, 407.1, 427/409, 410, 412.1, 430.1, 435; 428/412, 447, 450

[56] References Cited
U.S. PATENT DOCUMENTS

4,636,440  1/1987  Jada ................................. 427/402 X
4,965,091  10/1990  Fratello et al. ....................... 427/64

*Primary Examiner*—Michael Lusignan

[57] ABSTRACT

A method of providing a substrate with a thin film coating of multiple layers by a single immersion of a substrate having active hydrogens on its surface into a coating solution including two or more dissimilar hydrolyzable and condensable organometallic compounds, water, a solvent, and a base, the solution having undergone substantially no polymer growth, for a time sufficient to form in situ the film on the substrate, removing and drying the coated substrate.

38 Claims, 4 Drawing Sheets

Reaction Mixture

$Si-(OCH_3)_4$ $A-Si-(OCH_2CH_3)_3$ $B_2-Si-(OCH_2CH_3)_2$ $C-Si-(OCH_2CH_2CH_3)_3$ $D_3-Si-OCH_2CH_2CH_3$

Surface Coating

LAYERED SOL-GEL COATINGS

BACKGROUND OF THE INVENTION

This invention relates to an improved method of forming thin, layered coatings on substrates by sol-gel processing and to coated articles formed thereby.

There is presently a growing need for protecting various substrates against corrosion and other environmental effects by the use of thin films resistant to these effects There is also a need to provide enhanced adhesion between such coated substrates and between coated and non-coated substrates with the use of commonly available adhesives such as epoxy, urethane, and acrylic adhesives. A need also exists for providing substrates with a greater resistance to surface abrasion and scratching.

The most common methods of applying protective films to substrates has been by chemical vapor deposition (CVD), plasma enhanced chemical vapor deposition (PECVD), sputtering and thermal oxidation. All have disadvantages, especially with regard to the low temperature preparation of dielectric films.

Another method for applying thin protective coatings to a variety of substrates is known as sol-gel processing. Sol-gel processing is a method whereby small molecules can be converted into polymeric or ceramic materials. Depending on the nature of the monomers, one can form anything between organic polymers such as polydimethylsiloxane and inorganic ceramics such as silicon dioxide. Typically one mixes metal alkoxides of network forming cations, e.g., Si, Al, B, Ti, P, in an appropriate solvent such as an alcohol with water and a catalyst. In the catalyzed solution the alkoxides are partially or completely hydrolyzed and then polymerized to form molecules of a glass-like oxide or ceramic network linked by bridging oxygen atoms The overall process that takes place using tetraethoxysilane as the metal alkoxide involves two main reactions. The first is the hydrolysis of the alkoxide to form the hydroxy-containing species (eq. 1).

$Si(OCH_2CH_3)_4 + H_2O \rightarrow HO\text{-}Si(OCH_2CH_3)_3 + CH_3CH_2OH$

This reaction can be repeated, depending upon the conditions, until all of the alkoxide groups have been replaced.

The second reaction is the condensation of the hydroxy-containing species to form metal-oxygen-metal bonds (eq. 2).

$2 HO\text{-}Si(OCH_2CH_3)_3 \rightarrow (CH_3CH_2O)_3\text{-}Si\text{-}O\text{-}Si(OCH_2CH_3)_3 + H_2O$ This reaction can proceed until all of the hydroxide groups have been used up, resulting in a network of ceramic-type bonds (eq. 3).

$n (CH_3CH_2O)_3\text{-}Si\text{-}O\text{-}Si(OCH_2CH_3)_3 \rightarrow 2n[SiO_2]$ The chemistry of sol-gel processing is well documented in the prior art. See, e.g., (1) Brinker et al, "Sol-gel Transition in Simple Silicates", J. Non-Cryst. Solids, 48 (1982), 47-64; (2) Brinker et al, "Sol-gel Transition in Simple Silicates II", J. Non-Cryst. Solids, 63 (1984) 45-59; (3) Schaefer et al, "Characterization of Polymers and Gels by Intermediate Angle X-ray Scattering", presented at the International Union of Pure and Applied Chemists MACRO'82, Amherst, MA, July 12, 1982; (4) Pettit et al, Sol-Gel Protective Coatings for Black Chrome Solar Selective Films, SPIE Vol. 324, Optical Coatings for Energy Efficiency and Solar Applications (pub. by the Society of Photo-Optical Instrumentation Engineers, Bellingham, Wash.) (1982) 176-183; (5) Brinker et al, "Relationships Between the Sol to Gel and Gel to Glass Conversions", Proceedings of the International Conference on Ultrastructure Processing of Ceramics, Glasses, and Composites, (John Wiley and Sons, N.Y.) (1984); (6) Brinker et al, "Conversion of Monolithic Gels to Glasses in a Multicomponent Silicate Glass System", J. Materials Sci., 16 (1981) 1980-1988; (7) Brinker et al, "A Comparison Between the Densification Kinetics of Colloidal and Polymeric Silica Gels", Mat. Res. Soc. Symp. Proc. Vol. 32 (1984), 25-32; all of which disclosures are incorporated by reference herein.

One of the drawbacks of these prior art sol-gel processes is that formation of thin coatings of multiple layers on a substrate requires multiple sequential immersions of the substrate into different coating solutions.

It is an object of the present invention to provide a substrate with a thin film coating of multiple layers by a single immersion of the substrate into a coating solution, thereby avoiding multiple sequential immersions of the substrate into different coating solutions to form a multiple layer coating.

It is another object of the invention to provide a substrate with a thin film coating of multiple layers which coating inhibits corrosion of the substrate.

It is another object of the invention to provide a substrate with a thin film coating of multiple layers which coating improves adhesion in substrate adhesive bonding applications.

It is another object of the invention to provide a substrate with a thin film coating of multiple layers which coating is complete and uniform even at thicknesses ranging from 5 to 500 A.

It is another object of the invention to provide a substrate with a thin film coating of multiple layers which coating has physical and chemical properties which vary as a function of the depth into the coating.

SUMMARY OF THE INVENTION

These and other objects of the invention are achieved by a single immersion of a substrate having active hydrogens on its surface into a coating solution comprising two or more dissimilar hydrolyzable and condensable organometallic compounds of a polymeric network-forming cation, water, a solvent, and a base, the solution having undergone substantially no polymer growth prior to immersion of the substrate. The substrate is allowed to remain in the coating solution for a time sufficient to form the coating in situ on the substrate and is then removed from the coating solution and dried. The dissimilar organometallic compounds have reactivities defined by their rates of hydrolysis and condensation in said coating solution, these reactivities are sufficiently different so that the most reactive of said organometallic compounds hydrolyzes and condenses to form a first thin coating layer on the substrate, followed by formation of subsequent thin coating layers by hydrolysis and condensation of the other organometallic compounds. The subsequent layers are formed substantially in decreasing order of the reactivities of the other organometallic compounds.

In a preferred embodiment, the dissimilar organometallic compounds will be metal alkoxides of the structure $R'_n-M-(OR)_{4-n}$ wherein R is H, substituted or unsubstituted aliphatic or aryl of 1-10 carbon atoms and 6-24 carbon atoms, respectively, R' is substituted or unsubstituted aliphatic or aryl of 1-20 carbon atoms and 6-24 carbon atoms, respectively, M is a polymeric network-forming cation such as silicon, boron, zirconium, titanium, aluminum, etc., and n is 0-3. R' may be —OR if the organometallic compounds have different M or when there is incomplete hydrolysis of at least one of the organometallic species present. R and R' may be substituted with any group which does not adversely affect the novel characteristics of the present invention. Suitable substituents for R and R' include, e.g. halogen, amino, carboxyl, hydroxyl, etc. Specifically, R can also be - "CR" wherein R" is alkyl, preferably of 1 to 15 carbon atoms, or aryl, preferably of 6 to 20 carbon atoms.

In a particularly preferred embodiment, the coating solution will contain a mixture of metal alkoxides of the structures $R'-M-(OR)_3$ and $M-(OR)_4$ wherein R is lower alkyl of from 1 to 5 carbon atoms, such as ethoxy, and R' is a group which promotes adhesive bonding, such as 3-aminopropyl. This embodiment thus employs tetraethoxysilane and 3-aminopropyltriethoxysilane.

In the method of the present invention, the need to carry out sequential coating applications to form layered coatings on a substrate is obviated. The inventors have found that layered coatings may be formed in a single coating step due to differing reactivities of metal alkoxides present in a sol-gel coating solution. The term "reactivity" refers to the rate at which a particular metal alkoxide undergoes hydrolysis of the —OR groups to form —OH groups and subsequent condensation of the —OH groups to form a network of ceramic-type bonds.

It is important to appreciate that the method of the invention differs from prior art sol-gel processes in that in the latter the coating composition is permitted to complete a certain polymer growth stage, short of gelation before it is applied. In contrast, the method of the invention involves immersing the substrate in the defined coating composition before it has undergone any substantial reaction or growth. This is conveniently accomplished by simply immersing the substrate immediately after the components of the coating composition are mixed. Alternatively, if convenient mixing means are available, the coating composition can be formulated while in the presence of the substrate.

The result is a suprisingly complete and uniform thickness coating that is invisible to the unaided eye and has few discernible features other than those of the substrate in scanning electron microscopy at 10,000 to 100,000×. Under typical reaction conditions it can take less than 30 minutes for the coating to reach its maximum thickness of about 400 to 700 A as determined by ellipsometry. Also, it has been suprisingly found that the ability of the coating to provide environmental resistance, e.g., to prevent corrosion of the underlying substrate does not seem to be directly related to the thickness of the coating. Maximum corrosion protection normally is unexpectedly reached when the coating is significantly less than 100 A thick. Without being bound to the hypothesis, it is believed that the protection is actually being provided by a reaction layer formed by reaction of the alkoxide and the active hydrogen-containing surface of the substrate. For example, where the metal alkoxide is silicon alkoxide and the substrate aluminum, the reaction layer will be aluminosilicate. Further coating material that builds up above this reaction layer provides little additional protection. This hypothesis is supported by data obtained by corrosion testing of samples with multiple coatings.

The reason why the time between formulating the coating solution and treating the substrate of interest is critical is not known for certain, but it is believed that undue delay between formulation and immersion results in polymer growth, ie., polymerization of the monomers into highly branched networks or colloids which are too large to form a continuous film on the surface to be coated. Consequently, irregular and permeable coatings exhibiting less than satisfactory environmental resistance are formed. Immersing the substrate to be coated immediately or shortly after formulation of the coating solution, that is, before it has had an opportunity to undergo this polymer growth allows the metal alkoxide monomer or monomers in their more reactive state to undergo reaction with the active hydrogen containing surface of the substrate to be coated and thereby form the uniform, impermeable reaction layer discussed above. While it is preferred that the immersion of the substrate be effected immediately after formulation of the coating solution, brief delay of up to say no more than about ten minutes is permissible depending on the formulation.

Another critical feature of the method of the invention resides in the use of a base as the catalyst for the sol-gel process involved. According to the literature, (see for example, Better Ceramics Through Chemistry", Materials Research Society Symposia Proceedings, Vol. 32, 1984; edited by Brinker, C. J.; Clark, D. E.; Ulrich, D. R.) acid catalyzed sol-gel reactions in coating methods are preferred since they lead to polymeric materials that can result in more densely packed, tighter coatings while the base catalyzed reactions lead to more branched networks. Surprisingly, use of acid catalysts in the method of the present invention fails to provide coatings exhibiting significant corrosion protection. As will be demonstrated below, a number of acid catalysts, including hydrogen chloride, acetic acid and others were used in the method of the invention but none of the solutions containing same produced films that gave significant corrosion protection. Again, why the acid catalysts are ineffective in the method of the invention is not entirely understood. Since none of the reactions using acid catalysts in the method the invention displayed visual evidence of the formation of colloids, it is possible that the condensation is so slow in acid that the hydrolyzed moieties never condense onto the surface of the substrate.

DETAILED DESCRIPTION OF THE INVENTION

Illustrative of suitable base catalysts that can be used in the method of the invention are ammonium hydroxide, alkali metal hydroxides such as sodium hydroxide, alkaline earth metal hydroxides such as barium hydroxide and calcium hydroxide and amine bases such as cyclohexylamine. The preferred base catalysts are ammonium hydroxide and equivalent weak bases The amount of base employed will vary depending upon the particular components selected but will always be present in a catalytic amount. In general, the base will be present in an amount that provides a coating solution having a pH of 7.5–10.0, preferably about 8.5 (as measured by indicator dyes).

The metal alkoxide, solutions of which are employed in the method of the invention, are the hydrolyzable metal alkoxides of a polymeric network-forming cation. Such alkoxides include those of the metals of Group II, III and IV of the Periodic Table, as well as the transition metals and other multivalent (e.g., +3, +4, +5, etc.) metals whose alkoxides form three-dimensional polymeric networks upon hydrolysis. Preferred amongst such metals are silicon, boron, zirconium, titanium, aluminum and other ceramic type materials.

The preferred metal alkoxides of the present invention correspond to the structure $R'_n$—M—$(OR)_{4-n}$ as described above. The metal alkoxides of the present invention can also be di-metaloxy alkoxides such as di-5-butoxyaluminoxytriethoxy silane or di-5-butoxytriethoxytriethoxysilane.

In the present invention, it has been found that the presence of two or more dissimilar metal alkoxides having substantially different reactivities as defined above, in a coating solution comprising water, a solvent and a base produces a thin film coating of multiple layers, i.e., a coating in which the chemical structure and physical properties of the coating vary as a function of depth into the coating The coating thus formed is anisotropic as opposed to an isotropic coating which would be formed when only a single type of alkoxide is present in the coating solution. Generally, when the dissimilar metal alkoxides present in the coating solution are tetraalkoxides, only a single layer of an oxide network will be formed on the substrate. However, if the tetraalkoxides have widely different reactivities as may result in incomplete hydrolysis of one of the tetraalkoxides species, an additional thin outer layer containing unhydrolyzed organic moieties may be formed on the oxide network layer. Such properties which may vary through the thickness of the coating comprise elastic modulus, permeability, chemical reactivity, cohesive strength, extent of cross-linking, porosity, hydrophobicity, and bondability.

Different metal alkoxides will have different reactivities (i.e. different rates of hydrolysis and condensation) in such a solution. At least three factors are believed to account for the differences in reactivities of various metal alkoxides: (1) the type of metal to which the alkoxide groups are bonded, (2) the presence of non-alkoxide groups bonded to the metal, and (3) the type of alkoxide groups which are bonded to the metal. The inventors have found it most desirable to control the reactivity of the metal alkoxide by varying the type of alkoxide groups which are bonded to the metal.

In general, with simple alkoxides such as —OR where R is lower alkyl of from 1-5 carbon atoms bonded to the metal, the reactivities of the alkoxides can be predicted by the size of the alkoxide. The size of the alkoxide affects reactivity for steric and electronic reasons which are known to one skilled in the art. The order of reactivity of simple alkoxides can be set forth as:

methoxy > ethoxy > isopropoxy > s-butoxy

Further control of reactivity can be achieved by varying the R' group bonded to the metal. Such R' groups comprise acetoxy and phenoxy groups, halides, hydrides, and hydroxyl groups and any other groups which do not adversely affect the novel characteristics of the present invention.

In a sol-gel coating solution in accordance with the present invention, the metal alkoxide which is the quickest to hydrolyze and condense will do so on the surface of the substrate. This is not to say that the other less reactive alkoxide species will not simultaneously hydrolyze and condense. However, the reactivities of any reacting species will be so different that the layer being formed at any given time is substantially composed of the reaction product of the most reactive species present in the coating solution. The chemical composition at a particular depth in the coating will, therefore, depend on the relative amounts of the reactive alkoxides in the sol-gel coating solution as well as the relative reactivities of the alkoxides present in the sol-gel coating solution. When the most reactive alkoxide has been substantially hydrolyzed and condensed as a coating, the composition of the subsequent coating layers formed will predominate in the condensation products of the next most reactive alkoxide, and so on in decreasing order of reactivity for the other alkoxides present, thereby resulting in a layered coating. Generally, there will be a gradual transition in composition between the various layers The transition between the various layers can be made more distinct by incorporating metal alkoxides of widely differing reactivities. A large difference in reactivities between alkoxides will allow a more reactive alkoxide to substantially completely hydrolyze and condense prior to any substantial hydrolyzation and condensation of a less reactive alkoxide species. In this case, the demarcation between coating layers will become more distinct.

The preferred metal alkoxides will be silicon alkoxides. Where corrosion protection is desired, it is desirable that at least one tetraalkoxide species such as tetraethoxysilane (TEOS) be present in the coating solution. The presence of a tetraalkoxide will allow formation of an oxide network layer on the substrate which improves resistance to corrosion. When a coating which promotes adhesive bonding is desired, at least one of the metal alkoxides present in the coating solution will contain at least one group which is not an alkoxide species. A typical useful molecule containing a non-alkoxide species which forms a layer which promotes adhesive bonding is 3-aminopropyltriethoxysilane. The use of molecules containing non-alkoxide groups is, however, not limited to adhesive bonding applications.

Consider the reactions that take place when using a mixture of tetraethoxysilane (TEOS) and 3-aminopropyltriethoxysilane. The aminosilane is less reactive than TEOS because of the carbon atom attached to the silicon center. The lower reactivity of the aminosilane can be attributed in part to steric hindrance effects which arise because an aminopropyl group is larger than an ethoxy group. Another factor which can explain the lower reactivity of the aminosilane stems from electron donation from the carbon atoms of the aminopropyl group to the silicon atom. The partial positive charge of the silicon atom is thus reduced thereby lowering the reactivity of the silicon center.

The first reactions to occur in such a solution will be the hydrolysis of the TEOS and aminosilane:

(1)

(2)

These reactions will, however, not occur at the same rate.

The hydrolysis of TEOS will occur at a much greater rate than that of the aminosilane. The hydrolysis reactions can proceed, depending on the reaction conditions, until all of the alkoxides have been replaced.

The next reactions to occur involve the condensation of the hydroxyl-containing species to form metal-oxygen-metal bonds:

(3)

(4)

(5)

Further hydrolysis and condensation of the hydroxylated silane can proceed until all of the hydroxide groups have been used up, resulting in a network of ceramic-type bonds:

(6)

Similarly for the aminosilane:

(7)

In a coating solution containing approximately equal molar quantities of TEOS and aminosilane (i.e. approximately equal volumes of each added to the coating solution), the reactivity of TEOS is approximately 10 times that of the aminosilane. Therefore, it is expected that initial condensation of the TEOS at the surface of say, an aluminum substrate, will occur at a rate of approximately 10 TEOS molecules condensed to 1 of the aminosilane molecules. As the more reactive TEOS is used up, the aminosilane condensation will begin to predominate. Thus, the final coated substrate will have a predominately aminosilane network as the outer layer of the coating.

The inventors analyzed the composition of a coating formed on an aluminum substrate immersed in such a coating solution containing approximately equal quantities of TEOS and 3-aminopropyltriethoxysilane (aminosilane) by volume.

An uncoated aluminum substrate was immersed into a sol-gel coating solution containing:

3 ml TEOS, 3 ml 3-aminopropyltriethoxysilane, 100 ml ethanol, 20 ml water, and 3 ml $NH_4OH$. The substrate was allowed to remain in the coating solution for 24 hours after which it was rinsed and allowed to dry in the air. The use of x-ray photoelectron spectroscopy (ESCA) combined with sputtering, using e.g. high-energy Ar atoms, enabled the inventors to obtain a profile of the chemical composition through the coating layer. While ESCA sputter depth profiling is a preferred method of analyzing the coating, other methods such as sputtering followed by profilometry, gravimetric analysis, absolute quantitation by solid state $^{29}Si$ NMR, and quartz crystal oscillation rate may be used for this purpose. It was found that the surface layer of the coating contained a nearly 1:1 ratio of N to Si atoms. This result is consistent with the condensation of aminosilane occurring after the TEOS has been used up (eq. 7). The analysis of the coating underneath the aminosilane surface layer revealed a steady drop in the N to Si atom ratio. At the surface of the substrate, it was found that the N to Si atom ratio had dropped to 1:10 which is consistent with an initial condensation of TEOS occurring at the substrate surface at a rate of 10 times that of the aminosilane. The first layer formed on the substrate was therefore predominately an $SiO_2$ network (eq. 6) and the outer coating layer was predominately an aminosilane network (eq. 7).

The presence of water in the coating solution is necessary for the reaction to take place. In most instances, a ratio of water to reactive alkoxide of about 2:1 volume to volume provides acceptable protective coatings.

The substrate that can be treated with the coating solutions can be any substrate that contains active hydrogens on it surface and includes substrates such as metals, metal alloys, ceramics, glasses, plastics and the like.

Active hydrogens as defined here are hydrogens that can be removed in aqueous base. Typically these hydrogens are bonded to such elements as oxygen and sulfur. Examples includes those found in hydroxy, thiol, sulfonic acid and carboxylic acid groups. Substrates containing these species under the conditions at which the coating is applied include most ceramics and metals with a surface oxide layer (which, on contact with water, contain surface hydroxyl groups). Thus, the invention has particular applicability to the coating of metal substrates such as aluminum, iron, copper and nickel. The metal surfaces can be part of an integral structure or simply a metal layer deposited on a dissimilar substrate. A specific use of the invention, for instance, will be in providing aluminum coated compact discs with a corrosion-resistant protective coating. Other substrates include silicon, titanium dioxide, carbon fibers, glass and paper. Substrates without active hydrogens on their surfaces can have them added through state of the art means. This includes the treatment of plastics, such as nylon and polycarbonate, with appropriate agents to generate active hydrogens on the surface. In the case of an inert polymer (i.e. no active hydrogens) such as polycarbonate, the active hydrogens can be incorporated with an amino group-containing alkoxysilane. Similar techniques for incorporating active hydrogens to other polymer surfaces will readily come to mind to those skilled in the art and are contemplated by the present invention. Other polymer substrates which can be used include polyamides, polymethacrylates, polyepoxides, and the like.

The composition of the coating solution will vary depending on the particular components selected and the intended application, but will generally comprise about 1 to 30 parts by volume metal alkoxide, 20 to 95 parts by volume solvent, 1 to 60 parts by volume water and 1 to 30 parts by volume of base catalyst.

A preferred formulation comprises 6 parts by volume metal alkoxide, 70 parts by volume ethanol, 27 parts by volume water and 3 parts by volume concentrated ammonium hydroxide.

The coating solution is conveniently formulated by diluting the solvent with the water and mixing in the base. The metal alkoxides are then added to the resulting solution and the resulting coating solution vigorously mixed.

Coating of the desired substrate is accomplished by immersing the substrate in the coating solution immediately after formulation, or shortly thereafter, and allowing the substrate to remain immersed until a coating of desired thickness has formed. The immersion can conveniently be conducted at room temperature but temperatures within the range of 0° to 100° C. can be employed if desired. After a few minutes, the coating solution which is initially clear and colorless turns hazy and starts to color (slightly blue in the case of TEOS). Shortly thereafter the solution becomes white and cloudy. The formation of colloids is presumably responsible for these visual changes. In a typical formulation, the thickness of the coating appears to reach a plateau after about 30 minutes and continued immersion does not lead to significant increases in thickness. Additional treatments, that is, starting the method over again leads to additional thickness being added at a similar rate, suggesting that the factors that limit the coating thickness are the reactions taking place in solution and not the build-up of material. As aforementioned, thicknesses beyond 100 Å do not appear to provide additional corrosion protection. In addition to providing corrosion protection, the layered coatings formed in the present invention by one immersion of the substrate into the coating solution are useful in a wide range of applications where it is desirable for different regions of a coating to be independently optimized for different functions. These functions might include elastic modulus, adhesion promotion, barrier properties, coefficient of thermal expansion, and index of refraction, to name a few.

It is believed that the uniformity in coating obtained by the present invention is the result of one of two distinct processes, or some combination of the two. Since the treatment solutions clearly form colloids it is possible that the colloids, or some type of pre-colloids, collect on the surface. These colloids would then coalesce into a coating. The resulting coating might then have lumps which would be connected more or less tightly to each other and to the surface. A second mechanism of coating formation involves the reaction of individual monomers, or pre-polymers, with the surface. According to this mechanism, the coating would then seem to "grow" off of the surface as monomers become attached in a mode more resembling a surface initiated reaction than a coating in the usual sense.

Similarly, the reason that these coatings end up being confluent even though they are very thin is not known. One possible explanation is that electrostatics are involved. The pH in the coating solutions is usually below 9 (as measured by indicator dyes) while the point of zero charge of the substrate is higher. This difference implies that when put into the coating solution, the surface of the substrate has a net positive charge. Likewise, the point of zero charge on $SiO_2$ is approximately pH 2. Thus, in the coating solution, the silanol (Si-OH) groups will be largely deprotonated (Si-O) and will carry a negative charge. Upon immersion of the substrate in the coating solution, the reacting silanol groups will thus be electrically attracted to the surface. Such an attraction might be responsible for the confluent coating when otherwise the silanol groups might nucleate in a more random pattern, resulting in a patchy coating.

After the coating is completed, the coated substrate is withdrawn and preferably rinsed in solvent and water and then dried. The drying can be effected by air drying or by heating the withdrawn coated substrate as by oven heating. If desired, the dried coated substrate can be baked at temperature of 50 to 1600° C. to cure the coated film.

The preferred metal alkoxides present in the coating formulation will depend on the desired use of the coated substrate. It may be desirable to incorporate one or more alkoxides which form a network of Si-O-Si linkages in which there is little presence of organic moieties. These types of alkoxides will facilitate formation of a corrosion-inhibiting barrier layer at the surface of the substrate. Such alkoxides will preferably comprise silicon alkoxides such as tetramethoxysilane, butyl(triethoxy)silane, and the like. A particularly preferred silicon alkoxide is tetraethoxysilane (TEOS). In addition to the barrier-layer forming alkoxides, it will usually be desirable to incorporate one or more metal alkoxides having organic moieties which do not undergo significant hydrolysis. The coating layer thus formed by the latter type of alkoxides will comprise a network of Si-O-Si linkages in which organic moieties are bonded to Si. The specific type of organic moieties to be included will depend on the desired use of the coated substrate. For example, when a coated substrate is to be bonded by use of a commercial adhesive, it may be desirable for the outer surface layer of the coating to contain amino groups which will interact with the adhesive to form a stable bond between the adhesive layer and the coated substrate. For example, an appropriate mixture of TEOS and 3-aminopropyltriethoxysilane in a coating solution containing water, solvent and a base catalyst will result in a coated substrate having a predominately $SiO_2$ layer on the surface of the substrate, and the outermost layer of the coating will contain the majority of the amino groups. In such an example, the substrate coating will be effective at both inhibiting corrosion of the substrate and enhancing adhesive bonding of the substrate. The former effect resulting from the $SiO_2$ layer formed on the surface of the substrate, and the latter effect resulting from the presence of amino functional groups on the outer surface of the coating.

Where corrosion protection of the substrate is not a primary objective, for example with substrates to be used in certain optical applications, it may be desirable for the organic moieties to be incorporated in each of the coating layers, including the layer on the surface of the substrate. In such a situation, each of the metal alkoxides in the coating formulation may contain organic moieties which do not undergo significant hydrolysis. It may be desirable to form an optical element in which the presence of different organic moieties in the various layers will result in different indices of refraction for the various layers.

Figure 1:
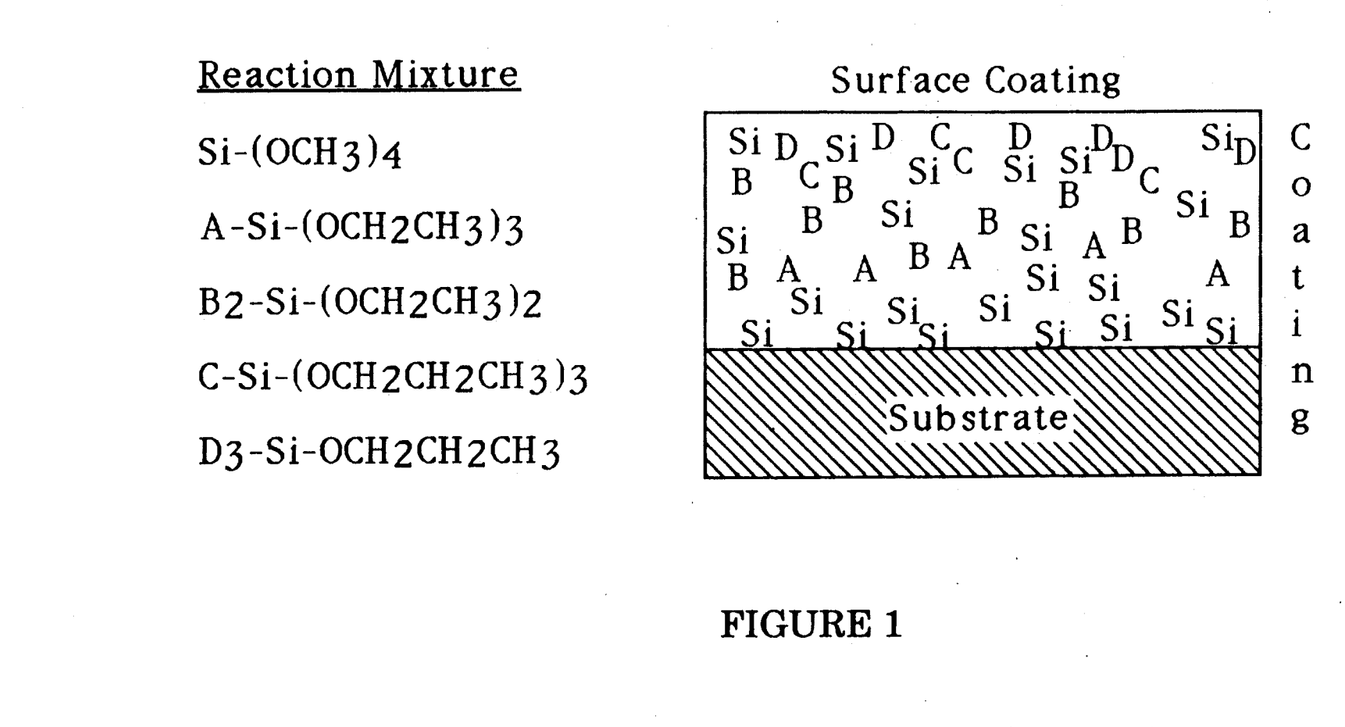
FIG. 1 is a schematic representation of a coating formed from a solution containing metal alkoxides having different reactivities. The figure illustrates the formation of layers in decreasing order of the reactivities of the metal alkoxides.

In a general example of coating a metal substrate, the coating solution may comprise the alkoxide components:

(1) Si-(OCH$_3$)$_4$
(2) A-Si-(OCH$_2$CH$_3$)$_3$
(3) B$_2$-Si-(OCH$_2$CH$_3$)$_2$
(4) C-Si-(OCH$_2$CH$_2$CH$_3$)$_3$
(5) D$_3$-Si-OCH$_2$CH$_2$CH$_3$ where the groups designated A, B, C, and D correspond to the R' groups as discussed above. Such a coating solution will result in a coating which can be schematically represented as shown in FIG. 1. Note that all oxygen atoms have been left out of FIG. 1 due to crowding. The SiO$_2$ layer on the surface of the substrate will be effective at inhibiting corrosion. The presence of the organic moieties A, B, C, and D elsewhere in the coating will serve any one or combination of the functions as described above.

The following examples are included to further illustrate the present invention.

EXAMPLE 1

Substrates to be coated by the method of the present invention were first prepared by cutting glass microscope slides to convenient sizes (eg. 0.5×3 cm). The cut slides were then cleaned by scrubbing with a mixture of soap (e.g. Liquinox) and water, followed by sonication in soap and water for 15 minutes. The slides were then rinsed 6 times in distilled water, followed by sonication for 10 minutes in acetone (or isopropanol), and drying under a stream of prepurified nitrogen piped through poly(tetrafluoroethylene) tubing. The dry slides were then immediately placed into a vacuum chamber for depositing thereon a thin layer (1000-2000 angstroms) of aluminum.

Aluminum wire (Balzers 99.99%) was evaporated in the vacuum chamber at a pressure of $5\times10^{-7}$; to $5\times10^{-6}$ torr (the pressure increased slightly during evaporation of the aluminum). Approximately 1000-2000 angstroms was deposited on the substrates at a rate of about 5 angstroms per second. The vacuum chamber was then backfilled with hydrocarbon free ultra-high purity oxygen (99.99%; a procedure which took approximately 5 minutes) The slides with the evaporated aluminum coating thereon were immediately removed from the chamber with poly(tetrafluoroethylene)-coated tweezers and, within 10 minutes were immersed in a sol-gel coating solution. This coating solution was made by first mixing ethanol (70 parts by volume), water (27 parts by volume), and concentrated ammonium hydroxide (3 parts by volume). Tetraethoxysilane (TEOS) (6 parts by volume) and 3-aminopropyltriethoxysilane (0.5 parts by volume) were then added and the solution was mixed vigorously for several seconds.

The aluminum coated slides were immersed in this solution immediately after it was formulated and were allowed to remain in the coating solution for 24 hours. The slides were then withdrawn from the coating solution, rinsed with ethanol and dried in air for 24 hours.

The structure of the coating which had formed on the aluminum substrates was then examined by techniques known in the art such as ESCA (x-ray photoelectron spectroscopy) combined with sputtering. The analysis of the coating structure revealed that a substantially two-layer coating had formed on the surface of the substrate.

Figure 2:
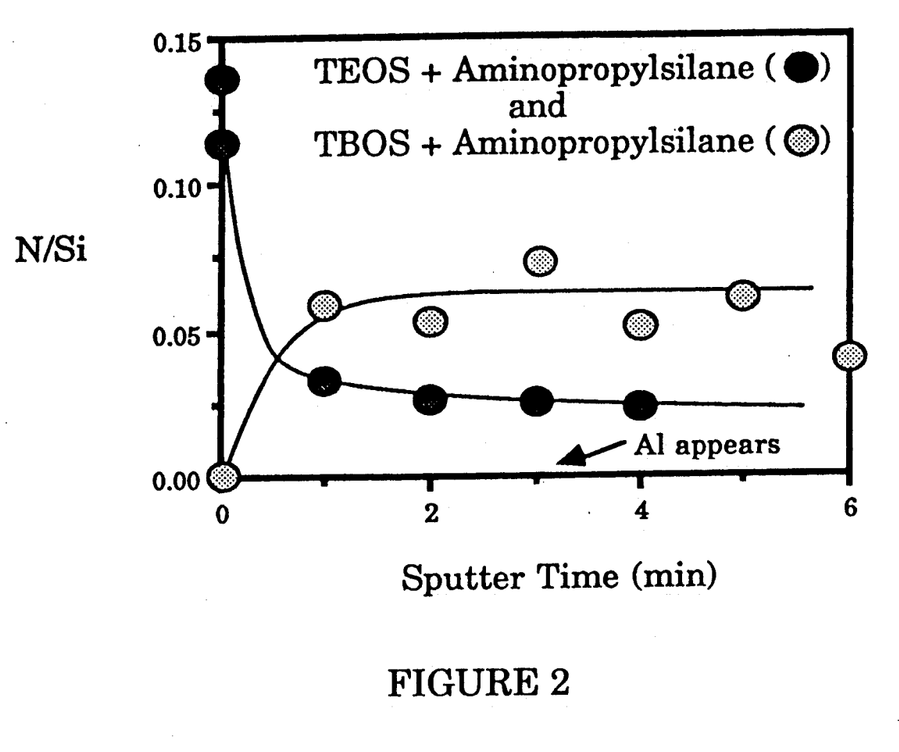
FIG. 2 is a graph indicating the results of the X-ray photoelectron spectroscopy (ESCA) and sputtering analysis of the coatings prepared in Examples 1 and 2.

As the coating was sputtered off, the ratio of N to Si atoms was measured as a function of the sputter time. The results are shown in FIG. 2. As seen in FIG. 2, the initial N to Si atom ratio is relatively high indicating that the outer coating layer contained a relatively high number of aminosilane groups while the inner coating layer contained relatively few aminosilane groups. These results are consistent with the fact that in such a coating solution, the TEOS will react much more quickly than the aminosilane, thereby resulting in a substantially two-layer coating structure having a predominately SiO$_2$ network formed on the substrate surface and an outer layer containing aminosilane groups.

EXAMPLE 2

The procedure of Example 1 was repeated except that the 6 parts by volume of TEOS in the coating solution was substituted with 6 parts by volume of tetrabutoxysilane (TBOS). Analysis of the coating structure was carried out by sputtering and ESCA as set forth in Example 1. The results are also shown in FIG. 2.

Again, a substantially two-layer coating had formed on the substrate surface. As seen from FIG. 2, the initial ratio of N to Si atoms is zero, indicating that the outer coating layer contained no aminosilane groups while the inner coating layer contained aminosilane groups. These results are consistent with the fact that in a coating solution containing TBOS and aminosilane. the TBOS reacts much more slowly than the aminosilane. One explanation for this result is that the aminosilane has three ethoxy groups as compared to four butoxy groups in TBOS. The steric effects arising from the presence of the larger butoxy groups will tend to result in the hydrolysis and condensation of the aminosilane first.

EXAMPLE 3

The procedure of Example 1 was repeated except that the 0.5 parts by volume of the 3-aminopropyltriethoxysilane in the coating solution was substituted with 0.2 parts by volume of 3-chloropropyltriethoxysilane (chlorosilane).

EXAMPLE 4

The procedure of Example 3 was repeated except that the 6 parts by volume of TEOS in the coating solution was substituted with 6 parts by volume TBOS.

EXAMPLE 5

The procedure of Example 3 was repeated except that the 6 parts by volume of TEOS in the coating solution was substituted with 3 parts by volume of TEOS and 3 parts by volume of TBOS.

Figure 3:
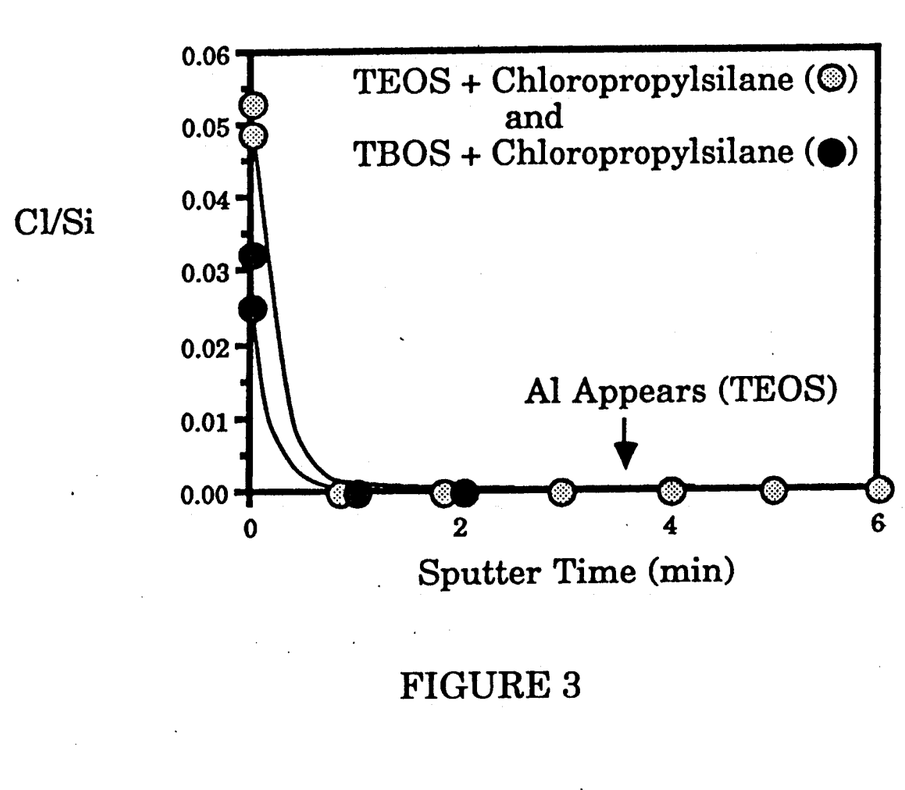
FIG. 3 is a graph of the ESCA and sputtering analysis of the coatings prepared in Examples 3 and 4.
Figure 4:
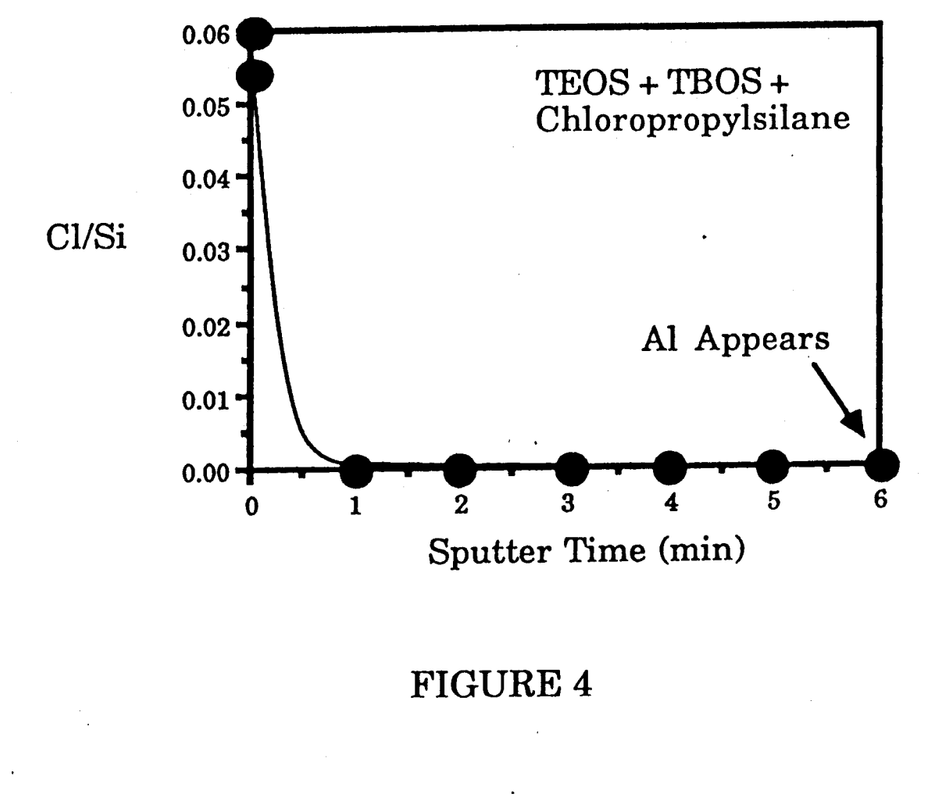
FIG. 4 is a graph of the ESCA and sputtering analysis of the coating prepared in Example 5.

Again, in each of Examples 3, 4, and 5, a substantially two-layer coating was formed on the substrate surface. The results of the sputtering and ESCA analysis for Examples 3 and 4 are shown in FIG. 3, and for Example 5 the results are shown in FIG. 4. Each of FIGS. 3 and 4 is a plot of the Cl to Si atom ratio as a function of the sputter time. As seen in FIGS. 3–4, the initial ratio of Cl to Si atoms is relatively high indicating that the outer coating layer contained chlorosilane groups, while the inner coating layer contained relatively few chlorosilane groups, with no chlorosilane groups observed in the coating layer at the substrate surface. These results are consistent with the fact that chlorosilane undergoes hydrolysis and condensation at a rate much slower than the TEOS or TBOS in the respective coating solutions. The net result in each case is a substantially two-layer coating structure with a predominately $SiO_2$ network inner layer and an outer layer containing chlorosilane groups.

As discussed above, one use of the multiple-layer sol-gel coatings of the present invention is adhesion promotion in substrate adhesive bonding applications. The multiple-layer sol-gel coatings disclosed in the present invention are also useful in inhibiting corrosion of the substrate thereby generally improving the environmental resistance of the coated substrates. It is often desirable to provide a coated substrate which has both resistance to corrosion and other environmental effects, and which has improved bonding capabilities when used with common adhesives. In such situations, both adhesion promotion and corrosion prevention must be simultaneously optimized.

Aluminum coated slides prepared by the procedure set forth in Example 1 were coated with various sol-gel coatings by the method of the present invention. The coating solutions, unless otherwise indicated, contained 100 parts by volume ethanol, 20 parts by volume water, 3 parts by volume concentrated $NH_4OH$, and approximately 6 parts by volume alkoxide monomers. The sol-gel coated slides were then tested for corrosion resistance in aqueous base (0.1 N NaOH). The results are shown in Table I, wherein "layer A" refers to the coating layer formed immediately on the substrate surface, "layer B" refers to the coating layer formed on layer A, and "layer C" refers to the coating layer formed on layer B. The structure of the coated substrate can be represented schematically as follows:

| |
|---|
| layer C |
| layer B |
| layer A |
| substrate |

TABLE I

| Trial | Coating Solution | Time to Corrode in 0.1 N NaOH (min) | Observed Coating Structure layer A | layer B | layer C |
|---|---|---|---|---|---|
| 1 | none | 3 | none | none | none |
| 2 | TEOS-only | 1500 | $SiO_2$ | none | none |
| 3 | TBOS-only | 1800 | $SiO_2$ | none | none |
| 4 | Aminosilane-only | 5 | aminosilane | none | none |
| 5 | TEOS + Aminosilane (5%) | 1500–2200 | $SiO_2$ | aminosilane | none |
| 6 | TEOS + Aminosilane (8%) | 600 | $SiO_2$ | aminosilane | none |
| 7 | TEOS + Aminosilane (25%) | 850 | $SiO_2$ | aminosilane | none |
| 8 | TEOS + Aminosilane (50%) | 150 | $SiO_2$ | aminosilane | none |
| 9 | TBOS + Aminosilane (8%) | 300 | aminosilane | $SiO_2$ | none |
| 10 | TBOS + Aminosilane (14%) | 300 | aminosilane | $SiO_2$ | none |
| 11 | TEOS (46%) + TBOS (46%) + Aminosilane (8%) | 1000 | $SiO_2$ (major) aminosilane (minor) | $SiO_2$ | none |
| 12 | TEOS-only, then Aminosilane-only | 1500 | $SiO_2$ | aminosilane | none |
| 13 | Aminosilane-only, then TEOS-only | 10 | aminosilane | $SiO_2$ | none |

As seen from Table I, when layer A consists of a predominately $SiO_2$ network, such as from the reaction of TEOS in the coating solution, the corrosion resistance is maximized. It is clear from Table I that a coated substrate having amino groups located predominately in the outer coating layer (layer B for two-layer coating structures) can be as resistant to corrosion as a substrate having a single coating layer of an $SiO_2$ network. It also evident from Table I that, generally, as the amount of aminosilane increases, the corrosion resistance tends to decrease. Without being bound to the theory, it is believed that corrosion resistance is lowered by the presence of amino groups at the substrate surface because of the interference of the amino groups with the formation of a tight aluminosilicate reaction layer at the substrate surface. Trials 12 and 13 in Table I involved sequential application of single layer coatings, while trials 1–11 involved the single-step formation of multiple coating layers in accordance with the method of the present invention.

The environmental resistance of joints made from adhesively bonded substrates which were coated by the method of the present invention was also tested. A two-part urethane structural adhesive such as Tyrite 7520 manufactured by the Lord Corporation was used to bond aluminum alloy 2024-T3 coupons which were previously coated with various sol-gel coatings in accordance with the procedure set forth in Example 1. The coating solutions, unless otherwise indicated, contained 100 parts by volume ethanol, 20 parts by volume water, 3 parts by volume concentrated $NH_4OH$, and approximately 6 parts by volume of alkoxide monomers. The adhesive was allowed to cure 4 days at room temperature prior to testing. The bonded samples were immersed in boiling water for 24 hours in an all-glass apparatus. The adhesion strength results are reported in Table II. Trials 7–10 in Table II involved sequential applications of single layer coatings while trials 1–6 involved the single-step formation of multiple coating layers in accordance with the method of the present invention.

TABLE II

| Trial | Alkoxide Monomers of Coating Solution | Strength After Boiling Water | Observed Coating Structure | | |
|---|---|---|---|---|---|
| | | | layer A | layer B | layer C |
| 1 | none | 15 kg | none | none | none |
| 2 | TEOS-only | 0 | SiO$_2$ | none | none |
| 3 | Aminosilane only | 475 | aminosilane | none | none |
| 4 | TEOS (92%) + Aminosilane (8%) | 620 | SiO$_2$ | aminosilane | none |
| 5 | TBOS (92%) + Aminosilane (8%) | 75 | aminosilane | SiO$_2$ | none |
| 6 | TEOS (46%) + Aminosilane (8%) + TBOS (46%) | 30 | SiO$_2$ (major) aminosilane (minor) | SiO$_2$ | none |
| 7 | TEOS then aminosilane | 580 | SiO$_2$ | aminosilane | none |
| 8 | Aminosilane then TEOS | 0 | aminosilane | SiO$_2$ | none |
| 9 | Aminosilane then Aminosilane | 440 | aminosilane | aminosilane | none |
| 10 | TEOS (92%) + Aminosilane (8%) then add TEOS | 50 | SiO$_2$ | aminosilane | SiO$_2$ |

It is evident from Table II that adhesion strength remains good when the substrate had an outer coating layer containing amino groups. It is believed that the amino groups present in the outer coating layer provide sites for covalent attachment of the adhesive.

Similar results were obtained in adhesion tests wherein the bonded substrates were not exposed to boiling water prior to conducting the adhesion test. In general, the inventors have found that simultaneous maximization of corrosion protection and adhesion promotion occurred when the ratio of N to Si atoms in the outer coating layer was greater than approximately 0.1 and when the ratio of N to Si atoms in the coating layer directly on the substrate surface was less than approximately 0.05. This type of structure can only result from sequential application of single-layer coatings or from the coating of the present invention involving a coating solution containing multiple dissimilar alkoxides.

What is claimed is:

1. A method of providing a substrate with a thin film coating of multiple layers by a single immersion of the substrate in a coating solution, said method comprising immersing a substrate having active hydrogens on its surface into a coating solution comprising two or more dissimilar hydrolyzable and condensable organometallic compounds of a polymeric network-forming cation, water, a solvent, and a base, said solution having undergone substantially no polymer growth prior to immersion of said substrate, allowing said substrate to remain in said coating solution for a time sufficient to form in situ said thin film coating of multiple layers on said substrate, and removing and drying said substrate having said thin film coating of multiple layers, said organometallic compounds having reactivities defined by the rates of hydrolysis and condensation of said organometallic compounds in said solution sufficiently different so that the most reactive of said organometallic compounds hydrolyzes and condenses to form a first thin coating layer on said substrate, followed by formation of subsequent thin coating layers by hydrolysis and condensation of the other organometallic compounds, said subsequent layers being formed substantially in decreasing order of the reactivities of the other organometallic compounds.

2. The method of claim 1 wherein said dissimilar organometallic compounds have dissimilar polymeric network-forming cations.

3. The method of claim 1 wherein said dissimilar organometallic compounds have dissimilar types of alkoxide groups bonded to the polymeric network-forming cation.

4. The method of claim 1 wherein said dissimilar organometallic compounds have different combinations of alkoxide groups and non-alkoxide groups bonded to the polymeric network-forming cation 5. The method of claim 1 wherein said dissimilar organometallic compounds have the structure:

$$R'_n\text{—}M\text{—}(OR)_{4-n}$$

wherein R is H, substituted or unsubstituted aliphatic or aryl of 1-10 carbon atoms and 6-24 carbon atoms, respectively, and R' is substituted or unsubstituted aliphatic or aryl of 1-20 carbon atoms and 6-24 carbon atoms, respectively, or —OR, and n=0-3.

6. The method of claim 1 wherein said dissimilar organometallic compounds have the structure:

$$R'_n\text{—}M\text{—}(OR)_{4-n}$$

wherein R is substituted or unsubstituted aliphatic of 1-10 carbon atoms and R' is substituted or unsubstituted aliphatic of 1-20 carbon atoms, and n=0-3.

7. The method of claim 1 wherein said dissimilar organometallic compounds have the structure:

$$R'_n\text{—}M\text{—}(OR)_{4-n}$$

wherein R is substituted or unsubstituted aryl of 6-24 carbon atoms and R' is substituted or unsubstituted aryl of 6-24 carbon atoms, and n=0-3.

8. The method of claim 1 wherein at least one of said dissimilar organometallic compounds is a silicon alkoxide.

9. The method of claim 1 wherein said solution comprises silicon alkoxides, water, alkanol and ammonium hydroxide.

10. The method of claim 9 wherein one of said silicon alkoxides is tetraethoxysilane and said alkanol is ethanol.

11. The method of claim 9 wherein one of said silicon alkoxides is octadecyltriethoxysilane.

12. The method of claim 9 wherein one of said silicon alkoxides is phenyltriethoxysilane.

13. The method of claim 9 wherein one of said silicon alkoxides is butyltriethoxysilane.

14. The method of claim 10 wherein said solution further comprises 3-aminopropyltriethoxysilane.

15. The method of claim 1 wherein the pH of said solution is about 7 to 10.

16. The method of claim 1 wherein the pH of said solution is about 8.5.

17. The method of claim 1 wherein the immersion period is about 5 minutes to 24 hours.

18. The method of claim 17 wherein said thin-film coating of multiple layers has a thickness of about 5-2000 A.

19. The method of claim 8 wherein said thin-film coating of multiple layers comprises a layer of $SiO_2$ on the surface of said substrate.

20. The method of claim 1 wherein said substrate is a polymer.

21. The method of claim 20 wherein said polymer is a polycarbonate.

22. The method of claim 21 wherein said polycarbonate is prepared by placing a polycarbonate substrate in an aqueous solution of an amino group-containing alkoxysilane and heating to react said polycarbonate with said silane.

23. The method of claim 22 wherein said amino group-containing alkoxysilane is aminopropyltrimethoxysilane.

24. The method of claim 1 wherein said substrate is a metal.

25. The method of claim 24 wherein said metal is aluminum or iron.

26. The method of claim 24 wherein said metal is an aluminum alloy.

27. The method of claim 24 wherein said substrate is an aluminum coated compact disc.

28. The method of claim 24 wherein said metal is an iron alloy.

29. The method of claim 1 wherein an outer layer of said thin-film coating of multiple layers promotes bonding to an adhesive.

30. The method of claim 29 wherein said adhesive is selected from the group consisting of epoxy, urethane, and acrylic adhesives.

31. The method of claim 29 wherein said outer layer contains amino groups.

32. The method of claim 31 wherein said amino groups form bonds with a two-part urethane adhesive.

33. The method of claim 19 wherein said layer of $SiO_2$ on said substrate provides protection of said substrate against corrosion.

34. The method of claim 1 wherein one of said layers promotes bonding to an adhesive and another of said layers provides corrosion protection.

35. A coated substrate made by the method of claim 1.

36. A coated substrate made by the method of claim 10.

37. A solvent resistant polycarbonate substrate prepared by the method of claim 22.

38. A corrosion resistant aluminum coated disc prepared by the method of claim 27.

* * * * *